US009469177B2

(12) United States Patent
Haefner (10) Patent No.: US 9,469,177 B2
(45) Date of Patent: Oct. 18, 2016

(54) HEAT TRANSFER MEDIUM CONNECTION ASSEMBLY UNIT, ESPECIALLY FOR A HEAT EXCHANGER ARRANGEMENT OF A VEHICLE HEATER

(71) Applicant: Eberspächer Climate Control Systems GmbH & Co. KG, Esslingen (DE)

(72) Inventor: Michael Haefner, Stuttgart (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 37 days.

(21) Appl. No.: 14/540,377

(22) Filed: Nov. 13, 2014

(65) Prior Publication Data

US 2015/0129169 A1    May 14, 2015

(30) Foreign Application Priority Data

Nov. 14, 2013  (DE) .................. 10 2013 223 241

(51) Int. Cl.
| | |
|---|---|
| *B60H 1/22* | (2006.01) |
| *F28F 9/02* | (2006.01) |
| *F28F 21/06* | (2006.01) |
| *B23P 15/26* | (2006.01) |

(52) U.S. Cl.
CPC .......... *B60H 1/2203* (2013.01); *B60H 1/2215* (2013.01); *F28F 9/0248* (2013.01); *F28F 9/0256* (2013.01); *F28F 21/06* (2013.01); *B23P 15/26* (2013.01); *B60H 2001/2278* (2013.01); *Y10T 29/4935* (2015.01)

(58) Field of Classification Search
CPC .............. B60H 1/2203; B60H 1/2215; B60H 2001/2278; F28F 21/06; F28F 9/0248; F28F 9/0256; Y10T 29/4935; B23P 15/26
See application file for complete search history.

(56) References Cited

U.S. PATENT DOCUMENTS

| | | | | |
|---|---|---|---|---|
| 4,172,496 A | | 10/1979 | Melnyk | |
| 4,234,040 A | * | 11/1980 | Argyle | ..................... F28F 9/00 123/568.12 |
| 4,997,033 A | * | 3/1991 | Ghiani | ................... B60K 11/04 123/563 |
| 5,297,823 A | * | 3/1994 | Dubost | .............. F16L 37/0842 285/23 |
| 6,089,465 A | | 7/2000 | Habijanec et al. | |
| 6,695,037 B1 | | 2/2004 | Humburg et al. | |

(Continued)

FOREIGN PATENT DOCUMENTS

| | | |
|---|---|---|
| CN | 103380015 A | 10/2013 |
| DE | 2831832 A1 | 2/1979 |

(Continued)

OTHER PUBLICATIONS

German Office Action dated Oct. 17, 2014.

(Continued)

*Primary Examiner* — Rodney Mintz
(74) *Attorney, Agent, or Firm* — McGlew and Tuttle, P.C.

(57) ABSTRACT

A heat transfer medium assembly unit, especially for a heat exchanger arrangement of a vehicle heater, includes a housing part (16) with at least one opening (22, 24) for receiving a connecting branch. At least one flexible fixing element is associated with the at least one opening (22, 24) for receiving a connecting branch. The at least one flexible fixing element is provided for fixing a connecting branch (12, 14) mounted in the opening (22, 24) for receiving a connecting branch for providing a connecting branch/housing part preassembled assembly unit (76).

8 Claims, 3 Drawing Sheets

(56) References Cited

U.S. PATENT DOCUMENTS

| | | | |
|---|---|---|---|
| 9,186,956 B2* | 11/2015 | Kominami | H05B 3/22 |
| 2013/0243411 A1 | 9/2013 | Kominami | |
| 2016/0053924 A1* | 2/2016 | Hoehn | B60H 1/00571 |
| | | | 285/81 |
| 2016/0082811 A1* | 3/2016 | Haefner | B60H 1/2209 |
| | | | 237/12.3 C |

FOREIGN PATENT DOCUMENTS

| | | | | |
|---|---|---|---|---|
| DE | 198 49 103 A1 | 4/2000 | | |
| DE | 101 44 174 C1 | 10/2002 | | |
| DE | 10144173 A1 * | 3/2003 | | B60H 1/2209 |
| DE | 10 2004 045 061 A1 | 3/2006 | | |
| RU | 2072069 C1 | 1/1997 | | |
| RU | 2274555 C2 | 4/2006 | | |

OTHER PUBLICATIONS

Russian Office Action of Dec. 1, 2015.
Chinese Examination Report of Apr. 5, 2016.

* cited by examiner

HEAT TRANSFER MEDIUM CONNECTION ASSEMBLY UNIT, ESPECIALLY FOR A HEAT EXCHANGER ARRANGEMENT OF A VEHICLE HEATER

CROSS REFERENCE TO RELATED APPLICATIONS

This application claims the benefit of priority under 35 U.S.C. §119 of German Patent Application DE 10 2013 223 241.1 filed Nov. 14, 2013, the entire contents of which are incorporated herein by reference.

FIELD OF THE INVENTION

The present invention pertains to a heat transfer medium assembly unit, as it can be used, for example, in conjunction with the heat exchanger arrangement of a vehicle heater in order to make it possible to connect this heat exchanger arrangement to the coolant system of a drive unit, for example, an internal combustion engine of a vehicle.

BACKGROUND OF THE INVENTION

Such a heat transfer medium assembly unit is known, for example, from DE 101 44 174 C1. The heat exchanger arrangement, in conjunction with which this prior-art heat transfer medium assembly unit can be used, comprises, associated with each connecting branch to be used, i.e., associated with a connecting branch used to feed the heat transfer medium and associated with a connecting branch used to remove the heat transfer medium, a connection opening each, into which an end section of a respective connecting branch can be inserted. The interaction of the connecting branches with the heat exchanger body is such that a preassembled state is established between the connecting branch, on the one hand, and the heat exchanger body, on the other hand, either by generating a press fit between a conical end section of a connecting branch and a correspondingly conically shaped connection opening or by a positive-locking meshing formation, which prevents the rotation of a connecting branch in relation to the heat exchanger body. The connecting branches positioned in the preassembled state in relation to the heat exchanger body are fixed at the heat exchanger body by a connecting branch holding-down clamp designed in the form of a plate-like component such that they can neither by rotated nor moved out of the associated connection openings.

Especially when a plate-like connecting branch holding-down clamp is used, this connecting branch holding-down clamp can be arranged on the heat exchanger body already assembled with the connecting branch in a complicated manner because of the bent shape of the connecting branches and because access to this assembly area is thus made difficult.

SUMMARY OF THE INVENTION

An object of the present invention is to provide a heat transfer medium assembly unit, especially for a heat exchanger arrangement of a vehicle heater, which makes simple assembly possible with a structurally simple design.

This object is accomplished according to the present invention by a heat transfer medium assembly unit, especially for a heat exchanger arrangement of a vehicle heater, comprising a housing part with at least one opening for receiving the connecting branch, wherein, associated with at least one opening for receiving a connecting branch, at least one flexible fixing element is provided for fixing a connecting branch mounted in the opening for receiving the connecting branch for providing a connecting branch/housing part preassembly assembly unit.

Turning away from the arrangement known from DE 101 44 174 C1, in which preassembly of the connecting branches is performed at first on the heat exchanger body and a connecting branch holding-down clamp is then arranged, provisions are made according to the present invention for a preassembled assembly unit to also comprise a housing part, which can be used as a connecting branch holding-down clamp, and the connecting branch or connecting branches to be provided thereon. The connecting branches are fixed by at least one fixing element, which interact with these, in relation to the housing part, and are thus maintained in a preassembled state. The preassembled assembly unit thus combined can be attached to a heat exchanger body of a heat exchanger arrangement in a simple manner, wherein the connecting branch or connecting branches can be brought, on the one hand, into heat transfer medium flow connection with a heat transfer medium flow space in the heat exchanger body, and, on the other hand, the housing part itself can be fixed at the heat exchanger body for fixing the connecting branch or connecting branches in relation to the heat exchanger body.

To make possible a stable interaction of the housing part with at least one connecting branch for fixing said connecting branch and thus for establishing or maintaining the preassembled state, it is proposed that the at least one opening for receiving the connecting branch have an inner circumferential contour adapted to an outer circumferential contour of a connecting branch that is to be received therein. This means that if, for example, the at least one opening for receiving a connecting branch has an essentially circular inner circumferential contour, a connecting branch that is to be inserted into this has a corresponding circular outer circumferential contour, preferably with a somewhat smaller cross-sectional dimension.

To make it possible to guarantee an efficient fixing effect for establishing or maintaining the preassembled state, it is proposed that a plurality of fixing elements arranged at spaced locations from one another be arranged on the inner circumference of the at least one opening for receiving the connecting branch.

Provisions may be made in an embodiment that can be built with an especially simple design and nevertheless functions reliably for at least one fixing element and preferably each fixing element to comprise a fixing tongue, which is made integrally with the housing part and projects into the at least one opening for receiving the connecting branch.

To make it possible to insert a connecting branch into an opening for receiving a connecting branch in a simple manner, especially also when such a connecting branch has a bent shape, it is proposed that at least one opening for receiving a connecting branch have a lateral connecting branch insertion opening. Stable fixing effect can be achieved in case of such an embodiment of an opening for receiving a connecting branch, for example, by at least one fixing element being provided in a circumferential area of the at least one opening for receiving a connecting branch, which circumferential area is located essentially opposite the connecting branch insertion opening, or/and by a fixing element being provided in at least one and preferably both circumferential areas of the opening for receiving a connecting branch, which said circumferential area or circumferential areas adjoin the connecting branch insertion opening in the circumferential direction.

To avoid forcing in the contact area of one or more fixing elements in relation to a respective connecting branch especially when arranging a preassembled assembly unit on a heat exchanger arrangement when such a connecting branch interacts with a connection opening, it is further proposed that, associated with at least one and preferably with each fixing element, an opening for receiving the fixing element be provided, which receives said fixing element if said fixing element is deformed. The flexible fixing elements can thus also be deformed to the extent that they are received essentially completely in the associated opening for receiving the fixing element, so that, utilizing the flexibility of the fixing elements, a slight mobility of a respective connecting branch is guaranteed, in principle, in an opening for receiving a connecting branch, which said openings receives said connecting branch.

To make it possible to guarantee a defined rotational positioning of a respective connecting branch in relation to the housing part or the entire heat exchanger arrangement in the preassembled state as well as in the finally assembled state, it is proposed that, associated with at least one opening for receiving a connecting branch, a first positive-locking meshing formation, preferably internal teeth, be provided on the housing part, and that a second positive-locking meshing formation, preferably external teeth, which can be caused to mesh with the first positive-locking meshing formation in a positive-locking manner, be provided on a connecting branch that is to be received in the at least one opening for receiving a connecting branch, wherein the connecting branch can be locked against rotation by positive-locking meshing between the first positive-locking meshing formation and the second positive-locking meshing formation. Provisions may be made now, for example, for the second positive-locking meshing formation to be provided on a flange area of a connecting branch, which said flange area projects radially outwardly in relation to a longitudinal axis of the connection branch.

Provisions may be made in an embodiment preventing the displacing motion of a connecting branch in relation to the housing part in at least one direction for the at least one opening for receiving a connecting branch to have a first opening length section for receiving a preferably essentially cylindrical section of a connecting branch to be received in the opening for receiving a connecting branch and a second opening length section providing the first positive-locking meshing formation for receiving a section of a connecting branch to be received in the opening for receiving a connecting branch, which said section provides the second positive-locking meshing formation, wherein the at least one opening for receiving a connecting branch has a smaller internal dimension in the first length section than in the second length section. Not only is a rotation of a connecting branch in relation to the housing part thus prevented by the positive-locking meshing formations in the preassembled state, but a defined positioning of the connecting branch or connecting branches in the direction of the longitudinal axis thereof in relation to the housing part, as it shall also be provided in the final assembled state, is also guaranteed as well.

The present invention pertains, further, to a heat exchanger arrangement, especially for a vehicle heater, comprising a heat exchanger body providing a heat transfer medium flow space and at least one heat transfer medium assembly unit according to the present invention, wherein a connection opening, which is to be brought into fluid-tight heat transfer medium flow connection with the connecting branch, is provided, associated with each connecting branch in the heat exchanger body, which said connecting branch is to be provided on the heat transfer medium assembly unit.

The housing part, which provides an essential component of the preassembled assembly unit, can also be used in the finally assembled state of the heat exchanger arrangement for holding at least one connecting branch in a stable manner when the housing part is or can be fixed to the heat exchanger body for fixing at least one connecting branch received in an opening of the housing part for receiving a connecting branch in relation to the heat exchanger body, such that the fixing element is secured against rotation at least by the positive-locking meshing of the first positive-locking meshing formation with the second positive-locking meshing formation and is held by the housing part against elimination of the flow connection with a connection opening.

The present invention pertains, further, to a method for manufacturing a heat exchanger arrangement having the above-described design. This method comprises the following measures:
a) Inserting at least one connecting branch into an opening of the housing part for receiving a connecting branch and providing in the process a preassembled assembly unit of the connecting branch and housing part by
  a1) generating a positive-locking meshing between a first positive-locking meshing formation of the housing part and a second positive-locking meshing formation of the connecting branch, which said positive-locking meshing secures the at least one connecting branch against rotation in the opening for receiving a connecting branch, and by
  a2) fixing the connecting branch in the opening for receiving a connecting branch against displacement in relation to the housing part by at least one fixing element acting between the fixing element and the housing part,
b) positioning the preassembled assembly unit of the connecting branch and housing part in relation to the heat exchanger body such that the at least one connecting branch comes into flow connection with a connection opening provided in the heat exchanger body, and
c) fixing the housing part on the heat exchanger body.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
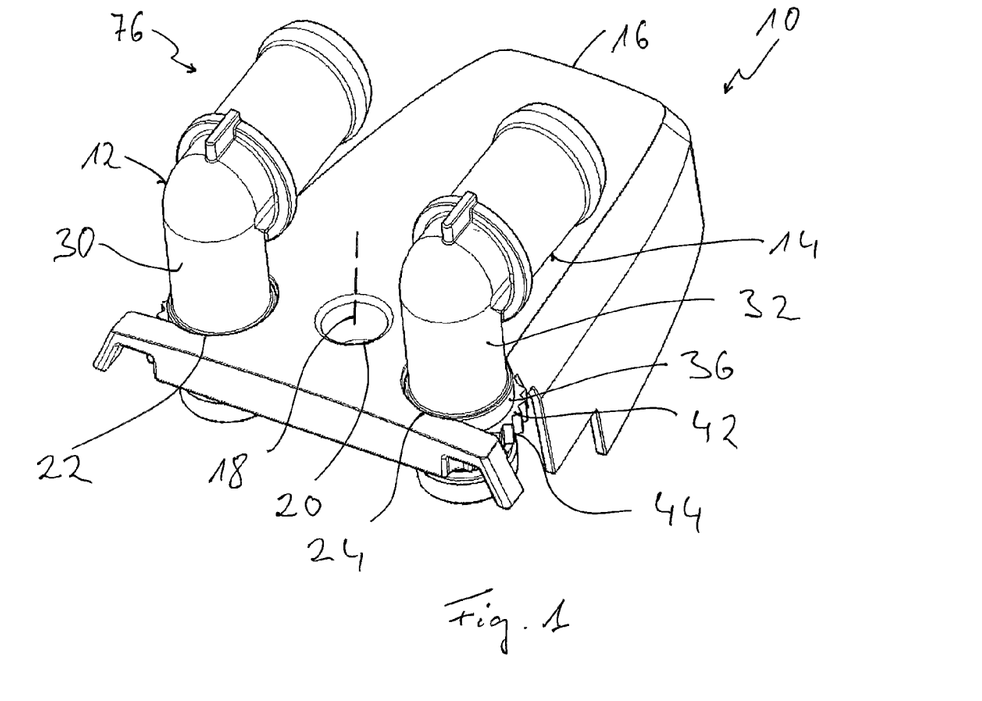
FIG. 1 is a perspective view of a heat transfer medium assembly unit with a housing part composed with two connecting branches to form a preassembled assembly unit.

Referring to the drawings, a heat transfer medium assembly unit is generally designated by 10 in FIG. 1. The heat transfer medium assembly unit 10 may be provided on a heat exchanger arrangement of a vehicle heater such that this heat exchanger arrangement can be connected to a heat transfer medium circuit, for example, the coolant circuit of an internal combustion engine, via two connecting branches 12, 14 of the heat transfer medium assembly unit 10, which said connecting branches are, for example, bent.

The heat transfer medium assembly unit 10 comprises a housing part 16 receiving the two connecting branches 12, 14. Just like the two connecting branches 12, 14, this housing part may be made, for example, of plastic material according to a casting method and have a generally cover- or cap-like configuration for fixation on a heat exchanger body of a heat exchanger arrangement of a vehicle heater. To fix the housing part 16 on the heat exchanger body, a fastening element 18 indicated symbolically in the form of a broken line in FIG. 1, for example, a bolt, can be passed through an access opening 20 provided in the housing part 16 and inserted into a corresponding opening of the heat exchanger body. It is recognized that the access opening 20 is provided in an area on the housing part 16 that is located essentially between the two connecting branches 12, 14, so that, as will be described below, stable fixation is also achieved for the connecting branches 12, 14 on or in the heat exchanger arrangement due to the fastening element 18.

Figure 2:
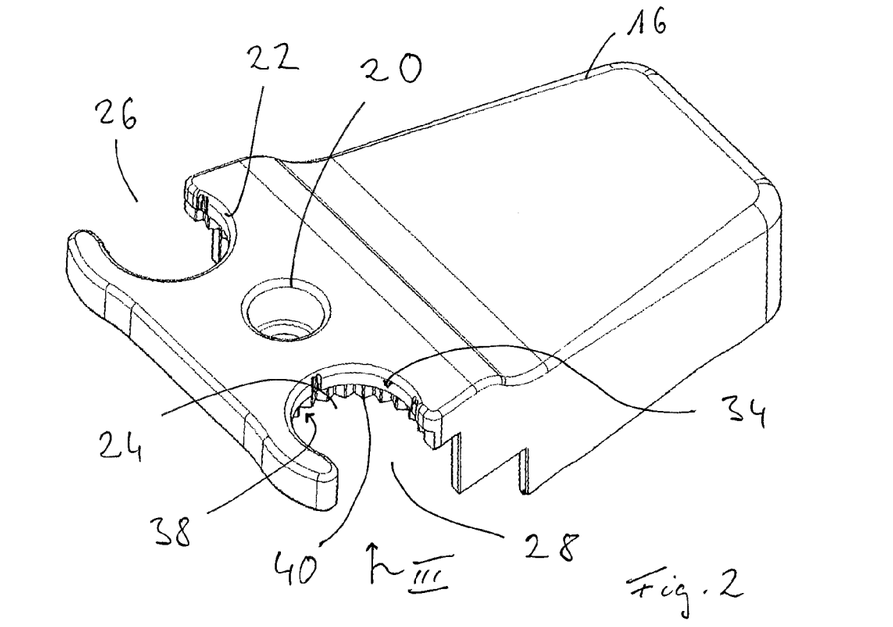
FIG. 2 is a perspective view of the housing part according to FIG. 1.

FIG. 2 shows that, associated with each of the two connecting branches 12, 14, an opening 22, 24 for receiving a connecting branch is provided on the housing part 16. The two openings 22, 24 for receiving a connecting branch are essentially of an identical shape and have an essentially circular inner circumferential contour. On their areas directed away from each other, the openings for receiving a connecting branch have lateral connecting branch insertion openings 26, 28 directed away from each other. The two connecting branches 12, 14 can be inserted laterally, for example, with respective areas 30, 32 having a smaller external dimension through these connecting branch insertion openings 26, 28. It should be pointed out, in general, that to generate a stable interaction between the connecting branches 12, 14 and the housing part 16, the connecting branches 12, 14 have an outer circumferential contour that is essentially complementary to the inner circumferential contour and consequently corresponds to this, i.e., it is essentially likewise circular.

The two openings 22, 24 for receiving a connecting branch have a first length section 34, which is located at the top in FIG. 2, i.e., in the direction away from the heat exchanger body, which is not shown. For example, a radially expanded, essentially cylindrical length section 36 of a respective connecting branch 12 and 14 is located in said first length section 34 when a connecting branch 12, 14 is received in a respective opening 22 or 24 for receiving a connecting branch. The connecting branches 12, 14 have an at least slightly larger external dimension, i.e., for example, a larger diameter in the length section 36 than in the respective section 30, 32, so that the connecting branches 12, 14 are already prevented in this manner from moving out of the openings 22, 24 for receiving connecting branches by a corresponding dimensioning of the lateral openings 26, 28 for receiving connecting branches. This is only possible if the connecting branches 12, 14 are positioned in relation to the openings 22, 24 for receiving connecting branches such that the sections 30, 32 can pass with a smaller external dimension through the connecting branch insertion openings (lateral openings) 26, 28.

Adjoining the respective first length section 34, the openings 22, 24 for receiving connecting branches have a respective second length section 38. This second length section 38 is formed with a somewhat larger internal dimension, i.e., with a somewhat larger diameter than the first length section 34, so that a cross-sectional expansion of the openings 22, 24 for receiving connecting branch, which expansion has, for example, an essentially step-like design, is provided in the transition from the first length section 34 to the second length section 38.

Figure 5:
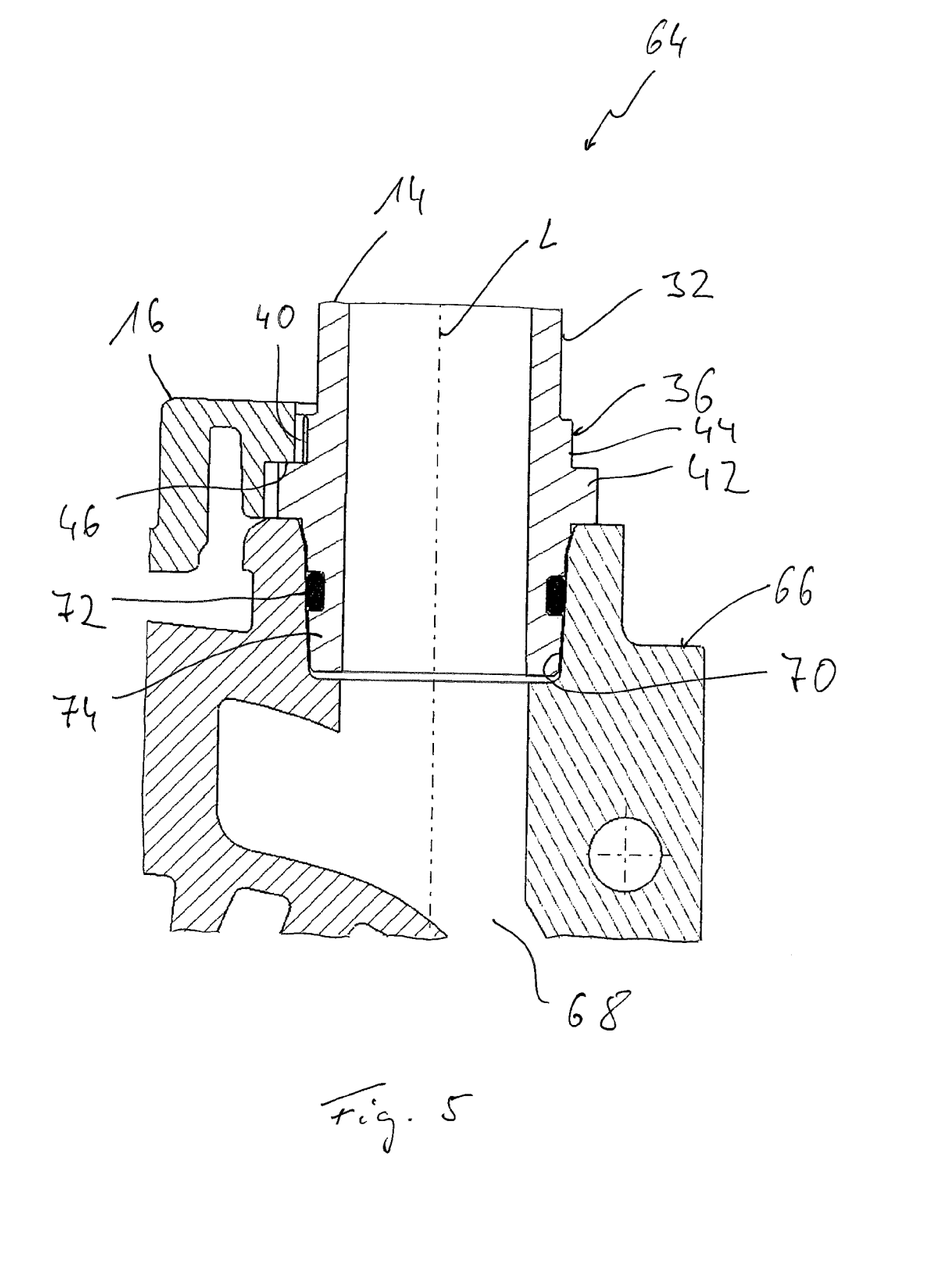
FIG. 5 is a partial sectional view of a preassembled assembly unit according to FIG. 1, which is arranged on a heat exchanger body of a heat exchanger arrangement.

The openings 22, 24 for receiving connecting branches are provided with a first positive-locking meshing formation 40 designed, for example, in the form of internal teeth, i.e., with radially inwardly directed teeth. Associated with this first positive-locking meshing formation 40, the connecting branches 12, 14 have a second positive-locking meshing formation 44 designed, for example, in the form of outer teeth, i.e., with radially outwardly directed teeth in a length section 42, which adjoins the section 36 and projects radially outwardly in the manner of a flange. This positive-locking meshing formation is shaped and dimensioned such that when a connecting branch 12, 14 is received in a respective opening 22, 24 for receiving a connecting branch, a positive-locking meshing, which prevents a respective connecting branch 12, 14 from rotating in the opening 22, 24 for receiving this connecting branch, is generated between the two positive-locking meshing formations 40, 44. Due to the aforementioned transition 46 between the first length section 34 and the second length section 38, which transition is, for example, a step-like transition, an axial stop is provided, furthermore, in the area passing through the corresponding opening 22, 24 for receiving a connecting branch, said stop being axial in relation to the longitudinal axis L of a respective connecting branch 12, 14, which said length section is shown in FIG. 5. This means that in the positioning of the connecting branches 12, 14 as shown in FIG. 1 in the corresponding openings 22, 24 for receiving connecting branches, these are secured against rotation about the respective longitudinal axis L by the positive-locking meshing of the two positive-locking meshing formations 40, 44 and the connecting branches 12, 14 are also fixed against displacement in one direction in the direction of the longitudinal axis L due to the flange-like expansion 42 cropping out axially in the area of the second positive-locking meshing formation 34 at the step-like transition 46 between the first length section 34 and the second length section 38.

Figure 3:
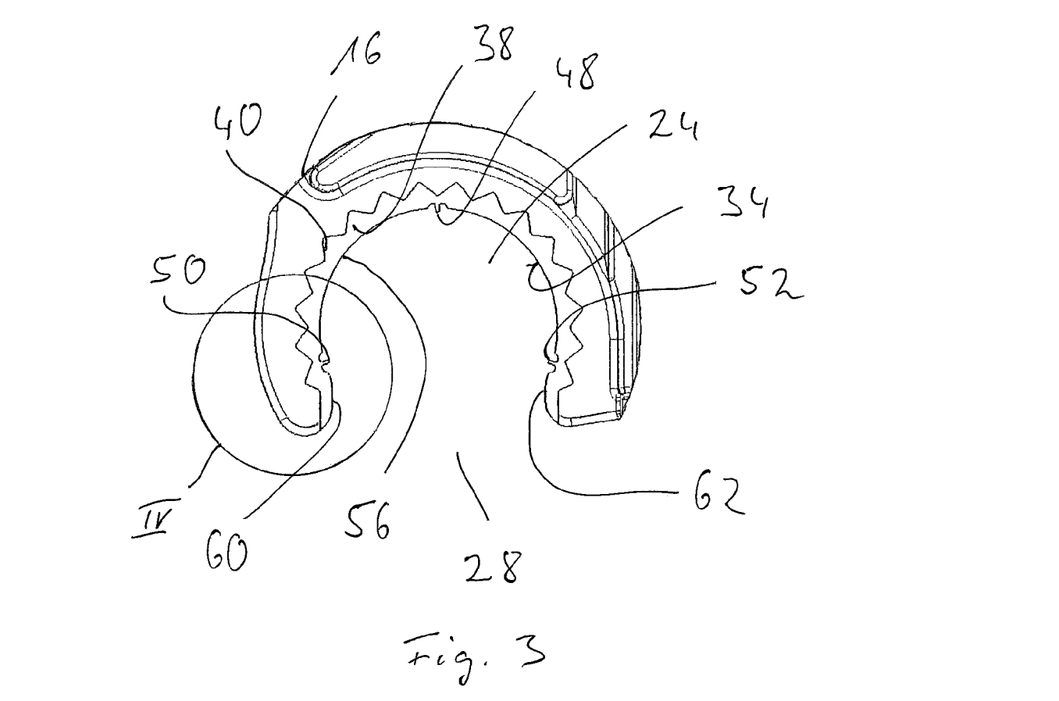
FIG. 3 is a detail view of the housing part according to FIG. 2 when viewed in direction III in FIG. 2.
Figure 4:
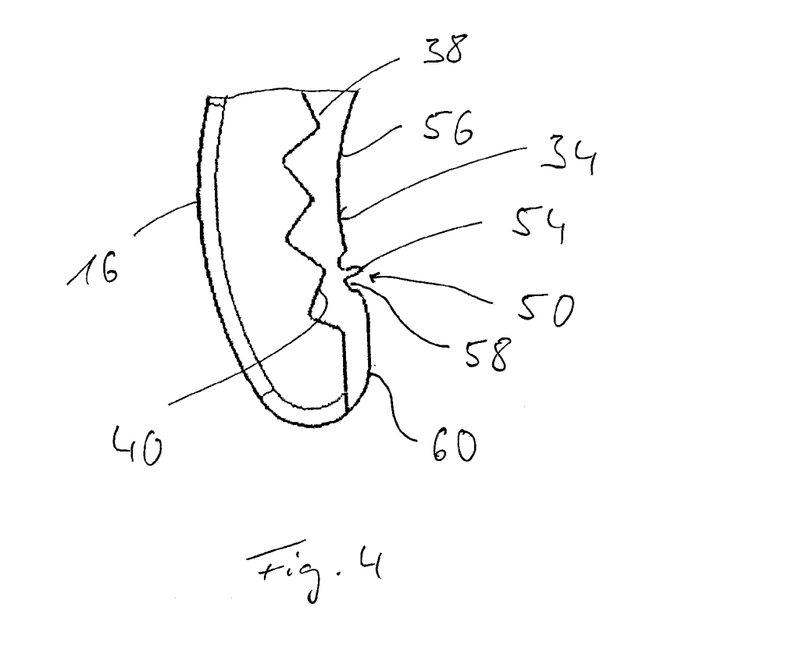
FIG. 4 is an enlarged view of the area of the housing part contained in circle IV in FIG. 3.

To prevent the connecting branches 12, 14 from falling accidentally out in the state shown in FIG. 1, in which the housing part 16 forms a preassembled assembly unit 76 with the connecting branch 12, 14 provided thereon, a plurality of flexible fixing elements 48, 50, 52, which can be recognized in FIG. 3 and whose number equals three in the exemplary embodiment shown, are provided, each associated with the openings 22, 24 for receiving connecting branches. Each of these fixing elements 48, 50, 52 is designed, as this is clearly shown in FIG. 4, in the form of a fixing tongue 54, which is made preferably integrally with the housing part 16 and which projects inwardly over the inner circumference 56 of the respective opening for receiving a connecting branch, here the opening 24 for receiving a connecting branch, which opening is shown in FIG. 3. Associated with each such fixing element 48, 50, 52, an opening 58 for receiving a fixing element is provided in the area of the inner circumference 56, and said opening 58 makes possible an essentially complete mounting, i.e., an essentially complete insertion of the fixing element in case of deformation of the respective flexible fixing element, here of the fixing element 50.

It is recognized in FIG. 3 that the fixing elements 48, 50, 52 shown there are arranged distributed over the inner circumference 56 of the opening 24 for receiving a connecting branch, so that the fixing element 48 is arranged essentially opposite the connecting branch insertion opening 28, while the fixing elements 50, 52 are arranged in circumferential areas 60, 62 of the opening 24 for receiving a connecting branch, which adjoin the connecting branch insertion opening 28 laterally. An approximately equal spacing of the fixing elements 48, 50, 52 from one another is thus achieved, and the mutual circumferential distance of the fixing elements 50, 52 provided in the area of the connecting branch insertion opening 28 from one another is somewhat greater than the distance from the fixing element 48.

If the connecting branches 12, 14 are arranged in the corresponding openings 22, 24 for receiving connecting branches, which is brought about by first inserting the connecting branches 12, 14 with their sections 30, 32 having a smaller external dimension into the openings 22, 24 for receiving connecting branches through the connecting branch insertion openings 26, 28, and are positioned in the process in the desired rotational positioning in relation to the housing part 16, and they are then displaced in the direction of the respective longitudinal axis L such that the positive-locking meshing formations 40, 44 undergo a positive-locking meshing and, furthermore, the respective length section 36 of the connecting branches 12, 14 comes to lie in the first length section 34 of the openings 22, 24 for receiving connecting branches, the fixing elements 48, 50, 52 also come into contact with the length sections 36 of the connecting branches 12, 14, which said length sections are now positioned in the first length section 34. Since the fixing elements 48, 50, 52 project inwardly, they are in contact with the length section 36, while undergoing deformation themselves. On the one hand, centering of the connecting branches 12, 14 in the openings 22, 24 for receiving connecting branch is achieved, this centering being made possible by a fit clearance between the positive-locking meshing formations 40, 44. Further, pressing of the flexible fixing elements 48, 50, 52 against the outer side of the section 36 of the connecting branches 12, 14 and the frictional meshing thus generated bring about a fixing effect, which prevents a displacement of the connecting branches 12, 14 in the direction of their longitudinal axis L, such that the positive-locking meshing between the positive-locking meshing formations 40, 44 is abolished.

The connecting branches 12, 14 can be combined with the housing part 16 in the above-described manner to form a preassembled assembly unit 76, which can then be mounted in a final assembly operation on a heat exchanger body 66 to produce a heat exchanger arrangement 64, which can be recognized in some areas only in FIG. 5. The heat exchanger body 66 has, associated with each of the connecting branches 12, 14, shown in FIG. 5 on the basis of the connecting branch 14, a connection opening 70, which leads to a heat transfer medium flow space 68 and in which an end section 74 of a respective connecting branch 12, 14, which also carries, for example, an O-ring-like sealing element 72 in a circumferential groove, can also be positioned meshingly. The preassembled assembly unit 76 comprising the housing part 16 and the connecting branches 12, 14 is consequently moved during this final assembly operation essentially in the direction of the longitudinal axes L of the connecting branches 12, 14 towards the heat exchanger body 66, so that the connecting branches 12, 14 are brought into a fluid-tight heat transfer medium flow connection with the respective corresponding connection opening 70 in the area of their end sections 74. The connecting branches 12, 14 can be inserted into the respective corresponding connection opening 70, for example, to the extent that the flange-like area 42 providing the second positive-locking meshing formation 44 is also in contact with the heat exchanger body 66. If this state is reached, the housing part 16 can be fixed to the heat exchanger body 66 by the fastening element 18 already described above. Since this fastening takes place in an area that is located essentially between the two connecting branches 12, 14, a single fastening element is sufficient to hold both connecting branches 12, 14 in a fluid-tight connection with the heat exchanger body 66 in a stable manner by means of the housing part 16 acting as a holding-down device. The connecting branches 12, 14 are fixed in this state against motion in the direction of the respective longitudinal axis L by the interaction with the heat exchanger body 66, on the one hand, and the step-like transition 46 of the housing part 16, on the other hand. Furthermore, the connecting branches 12, 14 are secured against rotation by the positive-locking meshing formations 40, 44, which mesh with one another, and possibly also by a press fit generated in the respective connection opening 70, so that they remain in the positioning already provided in the preassembled state, as this can also be recognized, for example, in FIG. 1.

The embodiment of a heat transfer medium assembly unit designed as a preassembled assembly unit according to the present invention guarantees not only a defined positioning of the connecting branches in relation to the housing part in the preassembled state and fixation of the connecting branch in this positioning in a simple manner, but also the establishment of the fluid-tight connection of the connecting branches to the heat exchanger body and the fixation of the housing part and thus of the entire preassembled assembly unit on the heat exchanger body in a simple manner when the final assembly operation is carried out, i.e., when the preassembled assembly unit is arranged on the heat exchanger body. No operations hindered by the positioning of the connecting branches, which may be, for example, bent, are necessary.

Finally, it should be noted that the principles of the present invention can, of course, also be applied in case of a different embodiment especially of the heat transfer medium assembly unit. For example, a separate housing part could be provided, for example, associated with each connecting branch, so that a heat exchanger arrangement to be manufactured according to the principles of the present invention can have a heat exchanger body that can be combined with two such preassembled assembly units. It is also obvious that the number, dimensioning and positioning of the fixing elements, which act to fix and center the connecting branches especially in the preassembled state, may deviate from the specific example being shown. A greater or smaller number of fixing elements could, for example, be provided also associated with a respective opening for receiving a connecting branch. The association of fixing elements with the respective openings for receiving connecting branches may also be achieved according to the principles of the present invention by these fixing elements being provided at connecting branches to be received in respective openings for receiving connecting branches, for example, also such that they radially project outwardly over the outer circumference thereof, so that when inserting a connecting branch into an opening for receiving a connecting branch, the fixing elements provided on the outer circumference of the connecting branch come into contact with an inner circumferential surface of the opening for receiving a connecting branch and thus generate the above-described fixing effect. Openings for receiving fixing elements may be provided on the outer circumference of a respective connecting branch, associated with the respective fixing elements having a tongue-like design in this embodiment as well in order to make it possible to mount these fixing elements at least partially on the inside in the radial direction in case of their deformation. Such fixing elements to be provided on a connecting branch may be arranged over the outer circumference of such a connecting branch, for example, with uniform circumferential distances from one another.

While specific embodiments of the invention have been shown and described in detail to illustrate the application of the principles of the invention, it will be understood that the invention may be embodied otherwise without departing from such principles.

What is claimed is:

1. A heat transfer medium assembly unit for a heat exchanger arrangement of a vehicle heater, the heat transfer medium assembly unit comprising:
    a housing part with at least one connecting branch receiving opening;
    a plurality of flexible fixing elements are associated with the at least one connecting branch receiving opening, the plurality of flexible fixing elements being provided for fixing a connecting branch mounted in the at least one connecting branch receiving opening to the housing part for providing a connecting branch-housing part pre-assembled unit, wherein the plurality of flexible fixing elements are arranged at spaced locations from one another and are provided on an inner circumference of the at least one connecting branch receiving opening;
    the at least one connecting branch receiving opening has a lateral connecting branch insertion opening allowing insertion of the connecting branch through the lateral connecting branch insertion opening into the at least one connecting branch receiving opening;
    wherein at least one of the flexible fixing elements comprises a fixing tongue formed integrally with the housing part and protruding into the at least one connecting branch receiving opening; and
    wherein at least one of (a) the at least one of the flexible fixing elements is provided in a first circumferential area of the at least one connecting branch receiving opening located opposite the lateral connecting branch insertion opening and (b) the at least one of the flexible fixing elements is provided in a second circumferential area adjoining the lateral connecting branch insertion opening with respect to a circumferential direction.

2. The heat transfer medium assembly unit in accordance with claim 1, wherein the at least one connecting branch receiving opening has an inner circumferential contour adapted to an outer circumferential contour of the connecting branch, which is to be mounted therein.

3. The heat transfer medium assembly unit in accordance with claim 1, wherein:
    a first positive-locking meshing formation with internal teeth is provided associated with the at least one connecting branch receiving opening;
    a second positive-locking meshing formation with external teeth is provided on the connecting branch to be received in the at least one connecting branch receiving opening locking the connecting branch against rotation by a positive-locking meshing between the first positive-locking meshing formation and the second positive-locking meshing formation.

4. The heat transfer medium assembly unit in accordance with claim 3, wherein the second positive-locking meshing formation is provided on a flange area of the connecting branch, said flange area protruding outwardly in a radial direction in relation to a longitudinal axis of the connecting branch.

5. The heat transfer medium assembly unit in accordance with claim 3, wherein:
    the at least one connecting branch receiving opening has a first opening length section for receiving a cylindrical section of the connecting branch to be mounted therein;
    the at least one connecting branch receiving opening has a second opening length section providing the first positive-locking meshing formation for receiving a section of the connecting branch providing the second positive-locking meshing formation;
    the at least one connecting branch receiving opening having a smaller internal dimension in the first length section than in the second length section.

6. A heat exchanger arrangement for a vehicle heater, the heat exchanger arrangement comprising:
    a heat exchanger body providing a heat transfer medium flow space; and
    at least one heat transfer medium assembly unit, the heat transfer medium assembly unit comprising:
    a housing part with at least one connecting branch receiving opening;
    a plurality of flexible fixing elements are associated with the at least one connecting branch receiving opening, the plurality of flexible fixing elements being provided for fixing a connecting branch mounted in the at least one connecting branch receiving opening to the housing part for providing a connecting branch-housing part pre-assembled unit, wherein the plurality of flexible fixing elements are arranged at spaced locations from one another and are provided on an inner circumference of the at least one connecting branch receiving opening;
    the at least one connecting branch receiving opening has a lateral connecting branch insertion opening;
    wherein a connection opening is associated with the connecting branch to be provided on the heat transfer medium assembly unit and the connection opening is to be brought into fluid-tight heat transfer medium flow connection with the connecting branch and is provided in the heat exchanger body;
    wherein at least one of the flexible fixing elements comprises a fixing tongue formed integrally with the housing part and protruding into the at least one connecting branch receiving opening; and
    wherein at least one of (a) the at least one of the flexible fixing elements is provided in a first circumferential area of the at least one connecting branch receiving opening located opposite the lateral connecting branch insertion opening and (b) the at least one of the flexible fixing elements is provided in a second circumferential area adjoining the lateral connecting branch insertion opening with respect to a circumferential direction.

7. The heat exchanger arrangement in accordance with claim 6, wherein:
    the housing part is fixable to the heat exchanger body for fixing the connecting branch mounted in the connecting branch receiving opening, whereby the connecting branch is secured against rotation by a positive-locking meshing of a first positive-locking meshing formation with second positive-locking meshing formation and is held by the housing part against elimination of the flow connection with the connection opening.

8. A method of manufacturing the heat exchanger arrangement in accordance with claim 6, the method comprising the steps of:

inserting the connecting branch into the at least one connecting branch receiving opening of the housing part and thereby providing the connecting branch-housing part pre-assembled unit by:

generating a positive-locking meshing securing the connecting branch against rotation in the at least one connecting branch receiving opening receiving the connecting branch between a first positive-locking meshing formation of the housing part and a second positive-locking meshing formation of the connecting branch; and fixing the connecting branch in the at least one connecting branch receiving opening against displacement in relation to the housing part by at least one said flexible fixing element acting between the connecting branch and the housing part;

positioning the connecting branch-housing part pre-assembled unit in relation to the heat exchanger body such that the connecting branch comes into flow connection with the connection opening provided in the heat exchanger body; and fixing the housing part on the heat exchanger body.

\* \* \* \* \*